United States Patent [19]

Sekimoto et al.

[11] Patent Number: 4,811,121

[45] Date of Patent: Mar. 7, 1989

[54] MAGNETIC RECORDING AND REPRODUCING SYSTEM USING PRECEDING AND LAGGING GROUPS OF ROTARY HEADS TO PERMIT COINCIDENT TIMING FOR REPRODUCED VIDEO AND AUDIO SIGNALS

[75] Inventors: Kunio Sekimoto; Masahiko Matsui, both of Katano, Japan

[73] Assignee: Matsushita Electric Industrial Co., Ltd., Osaka, Japan

[21] Appl. No.: 781,150

[22] PCT Filed: Jan. 24, 1985

[86] PCT No.: PCT/JP85/00026

§ 371 Date: Sep. 23, 1985

§ 102(e) Date: Sep. 23, 1985

[87] PCT Pub. No.: WO85/03400

PCT Pub. Date: Aug. 1, 1985

[30] Foreign Application Priority Data

Jan. 26, 1984 [JP] Japan ................... 59-12378

[51] Int. Cl.$^4$ ........................................... H04N 5/782
[52] U.S. Cl. ................................. 360/19.1; 360/14.1; 360/36.1; 358/330; 358/343
[58] Field of Search ........................... 360/8, 10.1–10.3, 360/14.1, 19.1, 36.1, 36.2, 77, 84; 358/310, 320, 330, 335, 337, 343, 328

[56] References Cited

U.S. PATENT DOCUMENTS

| | | | |
|---|---|---|---|
| 3,909,512 | 9/1975 | Omori et al. | 360/8 X |
| 4,303,950 | 12/1981 | Taniguchi et al. | 360/10.3 X |
| 4,353,098 | 10/1982 | Heinz et al. | 360/19.1 X |
| 4,389,680 | 6/1983 | Gramling | 360/84 X |
| 4,425,585 | 1/1984 | Sekimoto et al. | 358/328 |
| 4,467,368 | 8/1984 | Horstmann | 358/334 X |
| 4,536,805 | 8/1985 | Maeda | 360/14.1 |
| 4,549,227 | 10/1985 | Hashimoto et al. | 360/36.2 X |
| 4,558,378 | 12/1985 | Shibata et al. | 360/19.1 |
| 4,558,382 | 12/1985 | Edakubo et al. | 360/77 |
| 4,575,772 | 3/1986 | Shimada et al. | 358/335 X |
| 4,577,236 | 3/1986 | Takanashi | 358/320 |
| 4,609,947 | 9/1986 | Yamagiwa et al. | 358/310 |
| 4,613,912 | 9/1986 | Shibata et al. | 360/19.1 |

FOREIGN PATENT DOCUMENTS 98727 1/1984 European Pat. Off. .
56-143773 11/1981 Japan .
57-119571 7/1982 Japan .

OTHER PUBLICATIONS

Journal of Electronic Engineering, vol. 19, No. 183, Mar. 1982, pp. 72–75, Tokyo, JP; M. Inatsu et al., "One Inch Helical VTR Emerging as Leader in Broadcasting Field".

Primary Examiner—Alan Faber
Assistant Examiner—W. R. Young
Attorney, Agent, or Firm—Stevens, Davis, Miller & Mosher

[57] ABSTRACT

The present invention relates to a magnetic recording and reproducing system of a rotary head type in which a video signal of a predetermined unit and audio signals corresponding to the video signal of the predetermined unit are sequentially recorded on and reproduced from a magnetic tape as a single record locus which is slanted with respect to the longitudinal direction of the magnetic tape by rotary heads. Two pairs of rotary heads are used as the rotary heads and the video signal and the audio signals to be processed are recorded by one pair of preceding heads among those two pairs of heads, while upon reproduction, the audio signals are reproduced by one pair of preceding heads and the video signal is reproduced by one pair of delayed heads. The reproduced audio signals and the video signal are processed to thereby obtain the video and audio signals in which the timings are coincident.

7 Claims, 8 Drawing Sheets

TABLE OF REFERENCE NUMERALS IN THE DRAWINGS

1 ... Y signal (luminance signal) input terminal,

2 ... R-Y signal input terminal,

3 ... B-Y signal input terminal,

4 ... time-axis compressor, 5, 6 ... frequency converters, 7, 8 ... recording amplifiers, 9, 9', 10, 10' ... video heads, 11, 12 ... reproducing amplifiers, 13, 14 ... frequency demodulators, 15 ... time-axis expander, 16 ... Y signal output terminal, 17 ... R-Y signal output terminal, 18 ... B-Y signal output terminal, 24, 25 ... audio signal input terminals, 26, 27 ... PCM converters, 28, 29 ... gate circuits, 30, 31 ... reproducing amplifiers, 32, 33 ... PCM demodulators, 34, 35 ... output terminals.

MAGNETIC RECORDING AND REPRODUCING SYSTEM USING PRECEDING AND LAGGING GROUPS OF ROTARY HEADS TO PERMIT COINCIDENT TIMING FOR REPRODUCED VIDEO AND AUDIO SIGNALS

TECHNICAL FIELD

The present invention relates to a magnetic recording and reproducing system of the rotary head type in which a video signal of a predetermined unit such as one field or the like and audio signals corresponding to the video signal of the predetermined unit length are sequentially recorded or reproduced by rotary magnetic heads in such a manner that those signals are recorded as a single record locus which is slanted with respect to the longitudinal direction of a magnetic tape.

BACKGROUND ART

At present, a helical scanning technique in which video tracks are obliquely traced on a tape by the rotary heads is the main type of scanning technique used in magnetic recording and reproducing systems (hereinafter, simply referred to as VTR). This type of scanning is employed in a VTR for use in the home to attain a miniaturized highly compact construction. For example, in VTR of the VHS system, the video signal is obliquely recorded on the tape having a width of ½ inch by use of two video heads arranged so as to be away from each other by 180° on the rotary cylinder having a diameter of 62 mm. On one hand, in broadcasting VTR as well, a miniaturized and light-weight VTR is demanded for portable use for collection of news and for production of field programs, and VTR's of the U-standard of ¾ inch are fairly used. For a news collection VTR, a high picture quality as well as small-size and light-weight is required for use in broadcasting. In the case of the U-standard VTR of ¾ inch, there is a limitation of miniaturization since the cylinder diameter is 110 mm and the tape width is ¾ inch. In addition, as for the recording method of the video signal, a method is adopted wherein the luminance signal is a frequency-modulated wave and the low frequency band is removed and the low frequency band converted carrier chrominance signal is added. Therefore, the frequency bands of the luminance signal and chrominance signal are limited and the picture quality is not necessarily satisfactory for use in broadcasting.

The small-sized and light-weighted system in which the reproduced image with a high picture quality is obtained has been proposed in consideration of the foregoing point (Japanese Patent Unexamined Publication No. 118490/1982). According to a system, the high quality image can be derived even by use of the cylinder of a diameter and the cassette of a size which are almost the same as those in the home-use VTR, and accordingly the system configuration can be miniaturized and made light-weight as compared with conventional news collecting VTR.

Figure 1:
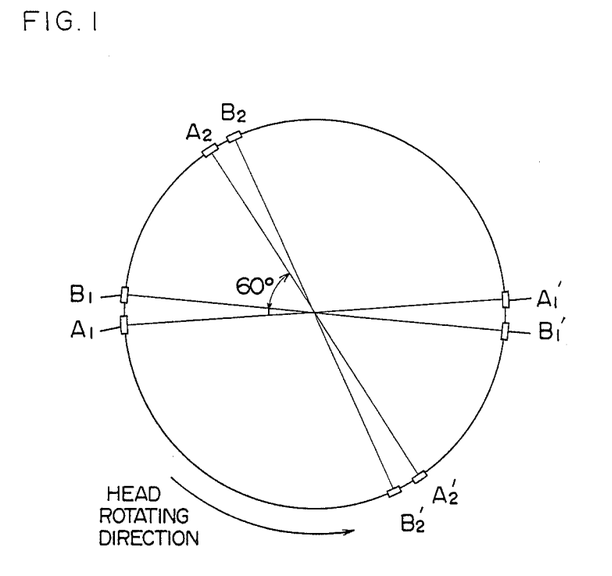
FIG. 1 is a plan view showing an arrangement of heads in a video and audio signal recording and reproducing system for use in the present invention.
Figure 2:
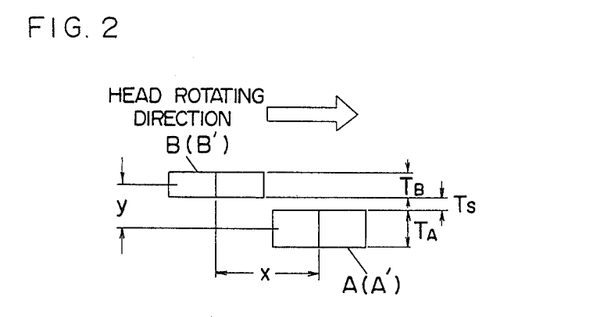
FIG. 2 is a front view of the main part of the same.
Figure 3:
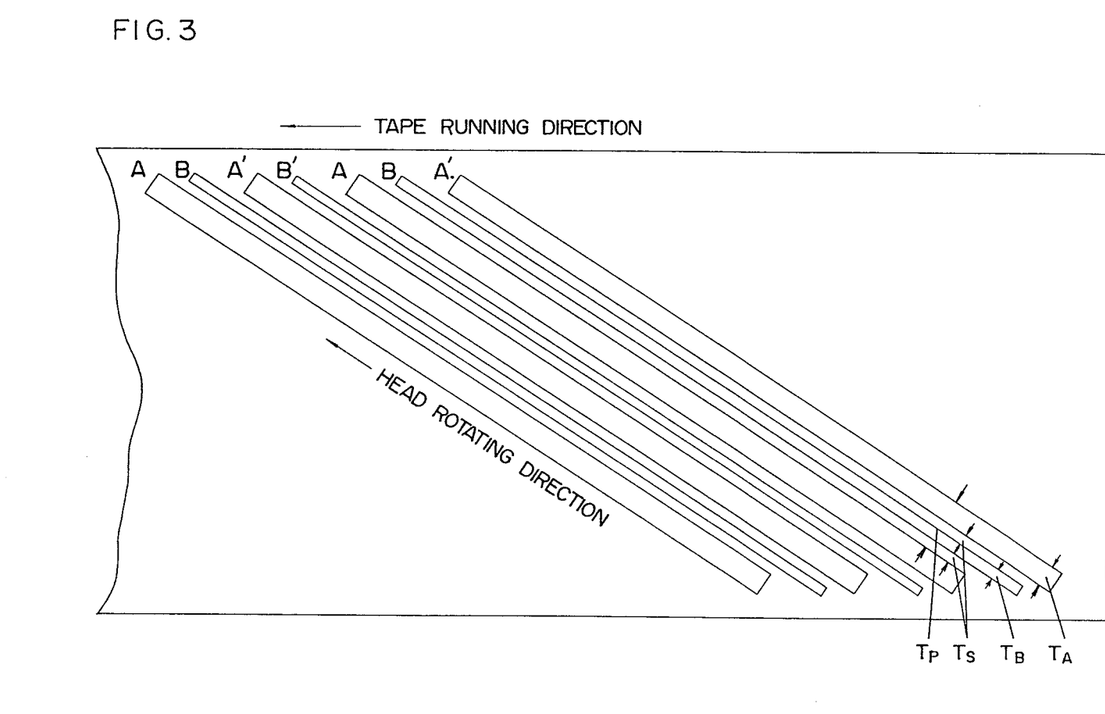
FIG. 3 is a diagram showing an example of a recorded pattern by the heads.
Figure 4:
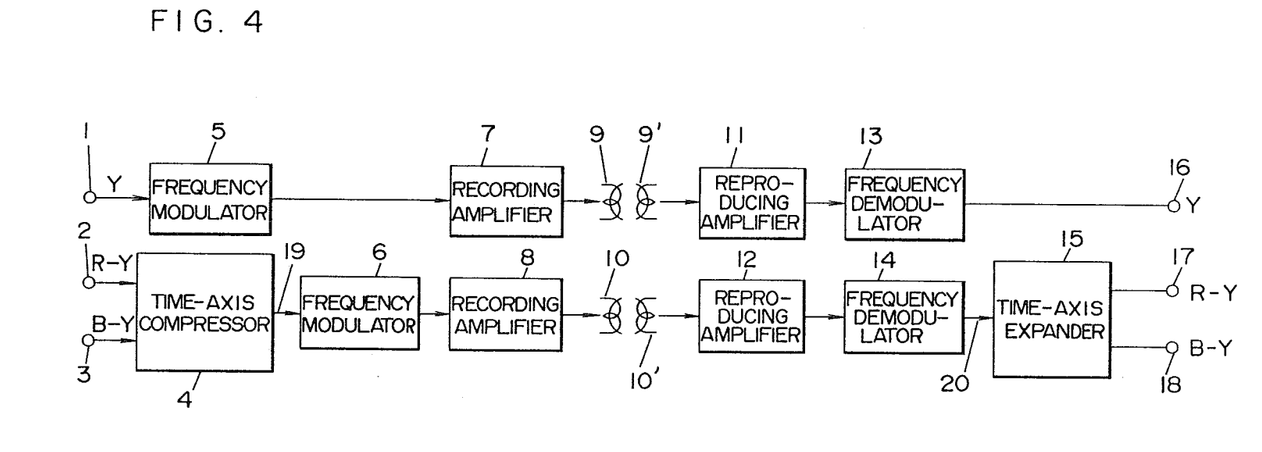
FIG. 4 is a block diagram showing one embodiment of a conventional video signal recording system by use of the heads.
Figure 5:
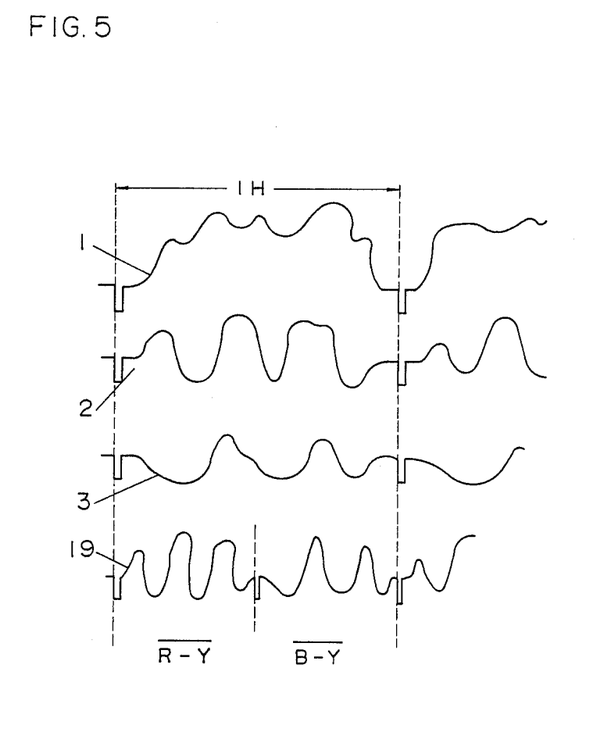
FIG. 5 is a waveform diagram showing the signals in the respective portions in FIG. 4.

FIG. 1 is a plan view of an arrangement of the heads on the cylinder for use in the foregoing system. FIG. 2 is a front view of the heads appearing in FIG. 1. FIG. 3 is a diagram showing an example of the recorded patterns by the heads. FIG. 4 is a block diagram of one embodiment of the recording system using the heads. FIG. 5 shows a waveform diagram of the main part in FIG. 4. The recording system will then be described with reference to FIG. 4.

In FIGS. 1 and 2, reference characters $A_1$ ($A_2$), $A_1'$ ($A_2'$) and $B_1$ ($B_2$), $B_1'$($B_2'$) denote two pairs of heads arranged at the positions on the circumference of the cylinder, which are away from each other by an angle of 180°, such that they are aligned at the same height of the cylinder. In FIG. 3, A, A', B, and B' indicate loci written by the heads $A_1$, $A_1'$, $B_1$, and $B_1'$, respectively. In FIGS. 2 and 3, $T_A$ and $T_B$ denote track widths of the heads $A_1$ ($A_1'$) and $B_1$ ($B_1'$), respectively, $T_P$ indicates a track pitch, and $T_S$ represents a space. When the diameter and rotating speed of the cylinder, the values of x and y in FIG. 2, the values of $T_A$, $T_B$ and $T_S$, the tape speed, and the angle between the tape and the record locus are now properly determined, the loci as shown in FIG. 3 are obtained when the heads are arranged at the positions as shown in FIGS. 1 and 2. For example, it is possible to constitute the VTR having the cylinder of substantially the same diameter as that in the VHS system VTR and being capable of recording for about twenty minutes by use of the VHS cassette tape. If a metal tape or the like is used, recording for 60 to 90 minutes can be performed.

As a method of recording and reproducing the color video signal by the recording and reproducing system as mentioned above, there is a method whereby the (frequency modulated) luminance signal is recorded by the $A_1$ ($A_1'$) head and the (frequency modulated) chrominance signals are recorded by the $B_1$ ($B_1'$) head. With such a method, the track width of the luminance signal can be enlarged and at the same time the frequency band can be set to be wide since no chrominance signal is added, so that a reproduced image of having a high S/N ratio and a high resolution can be obtained. In addition, with respect to the chrominance signals as well, the base band signals (for instance, the R-Y and B-Y signals) can be recorded as frequency modulated signals; therefore, a reproduced signal of a high frequency band and a high S/N ratio can be obtained. It is possible to construct the small-sized and light-weight VTR with a high quality having a cylinder and a cassette of substantially the same size as those in the home use VTR and being capable of recording for 60 to 90 minutes.

In FIG. 1, heads $A_2$ ($A_2'$) and $B_2$ ($B_2'$) arranged at the positions which are delayed by 60° from the heads $A_1$ ($A_1'$) and $B_1$ ($B_1'$) are used for reproduction. The recording is performed using the $A_1$ ($A_1'$) and $B_1$ ($B_1'$) heads and at the same time the reproduction is performed (simultaneous reproduction) to thereby check the recorded state. Or, those reproducing heads are arranged on movable elements such as piezo-electric elements or the like so that the record tracks are accurately traced in a special reproducing mode, thereby enabling the reproduction of a noise-free video image.

The recording system of FIG. 4 will be described hereinbelow with reference to FIGS. 3 to 5. In FIG. 4, reference numeral 1 denotes a Y signal (luminance signal) input terminal; 2 is an R-Y signal input terminal; 3 a B-Y signal input terminal; 4 a time-axis compressor; 5 and 6 frequency modulators; 7 and 8 recording amplifiers; 9 (9') and 10 (10') video heads; 11 and 12 reproducing amplifiers; 13 and 14 frequency demodulators; 15 a time-axis expander; 16 a Y signal output terminal; 17 an R-Y signal output terminal; and 18 a B-Y signal output terminal.

In FIG. 5, reference numerals 1, 2 and 3 denote waveforms of the input Y signal, R-Y signal and B-Y signal, respectively, (horizontal sync signals are added also to the R-Y and B-Y signals for the purpose of convenience). Numeral 19 denotes a waveform of an output signal of the time-axis compressor 4 and is a waveform at the position indicated by the numeral in FIG. 4. The Y signal applied to the Y signal input terminal 1 is modulated by the frequency modulator 5 and is amplified by the recording amplifier 7, and thereafter it is recorded on the tape by the head 9. The Y signal has a frequency band of about 4.5 MHz and the frequency deviation for modulation is set to, for instance, 5 to 7 MHz to record and reproduce the Y signal with good performance. The R-Y signal and B-Y signal applied to the R-Y signal input terminal 2 and B-Y signal input terminal 3 are time-axis compressed and synthesized by the time-axis compressor 4 in such a manner that the R-Y signal appears in the former half portion and the B-Y signal appears in the latter half portion of one line (1H), as shown in the waveform 19 in FIG. 5. This synthesized signal is modulated by the frequency modulator 6 and is amplified by the recording amplifier 8, and thereafter it is recorded on the tape by the head 10. Since the R-Y and B-Y signals have a frequency band of about 1.5 MHz, the synthesized signal derived by compressing the time axis of each signal to ½ has a frequency band of about 3 MHz. The frequency deviation of this synthesized signal is set to, e.g., 4 to 6 MHz. FIG. 3 shows the tape pattern obtained by recording the Y signal and chrominance signal by way of the two pairs of heads having the above-mentioned structure in this manner. In FIG. 3, A and A' denote the record loci of the Y signal, while B and B' indicate the record loci of the chrominance signal. As shown in FIG. 3, with respect to the Y signal in case of the 20-minute recording, the track width is set to be wider than that in a conventional home use VTR. On the other hand, for the chrominance signal, the FM carrier frequency is low and the frequency band is about 3 MHz, so that the reproduction can be performed with a good S/N ratio. Moreover, the use of the metal tape or the like makes it possible to perform the recording for 60 to 90 minutes without deterioration of performance. Upon reproduction, the Y signal reproduced by the head 9' is amplified by the reproducing amplifier 11 and is demodulated by the frequency demodulator 13, so that the reproduced Y signal is derived from the output terminal 16. On the other hand, the chrominance signal reproduced by the head 10' is amplified by the reproducing amplifier 12 and is demodulated by the frequency demodulator 14, and thereafter it is expanded by the time-axis expander 15 and is separated into the original R-Y signal and B-Y signal. Thus, the reproduced R-Y signal and B-Y signal are obtained from the output terminals 17 and 18. This reproduction can be performed simultaneously with the recording (simultaneous reproduction).

As described above, according to the system of FIG. 4, a reproduced image of a high quality can be obtained and the simultaneous reproduction and a noiseless search can be also carried out. However, with regard to the audio signals, only the conventional linear track is provided, so that the S/N ratio is about 50 to 55 dB and there is a limitation of performance.

Figure 6:
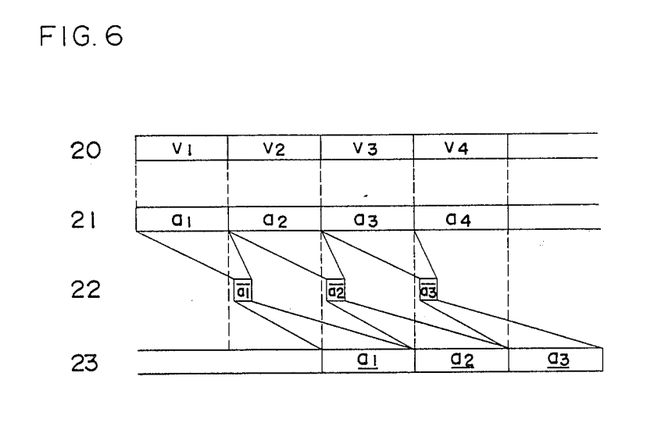
FIG. 6 is a diagram showing the signal timings in the video and audio signal recording and reproducing system.
Figure 7:
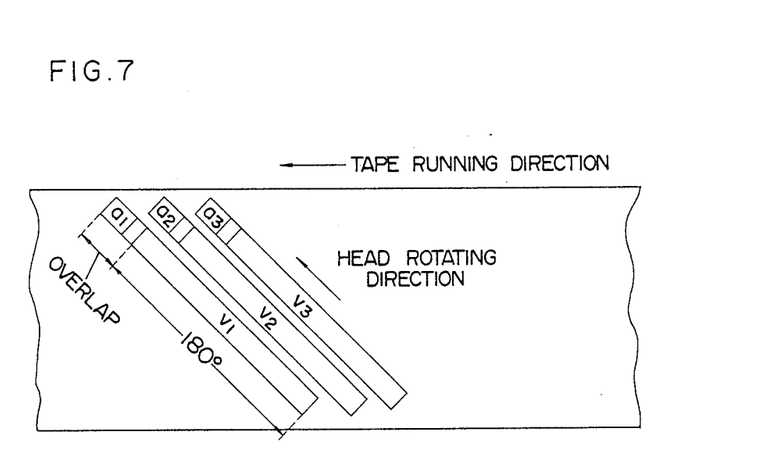
FIG. 7 is a recorded pattern diagram in the system.

A PCM recording system whereby the audio signals are digitized and recorded has been recently put into practical use as a recording/reproducing method for obtaining audio signals of a high quality. As a method for audio PCM recording in a VTR, in case of the two-head helical scan VTR, there is a method whereby the wrap angle of tape onto the rotary cylinder is set to a value larger than 180° and the time-axis compressed PCM audio signals are recorded into the overlap portion. FIG. 6 shows the timing relationship between the video and audio signals according to this method and FIG. 7 shows a recorded pattern. In FIGS. 6 and 7, reference numeral 20 denotes an input video signal; 21 an input audio signal; 22 a recorded audio PCM signal which was time-axis compressed; and 23 a reproduced audio signal which was returned to the original states. Reference characters $v_1, v_2, \ldots$ denote signals for every field of the video signal; $a_1, a_2, \ldots$ are audio signals corresponding to $v_1, v_2, \ldots$; $\bar{a}_1, \bar{a}_2, \ldots$ are compressed PCM signals of $a_1, a_2, \ldots$; and $\underline{a}_1, \underline{a}_2, \ldots$ are reproduced audio signals which were returned to the original states. As shown in FIGS. 6 and 7, the audio signals are processed on a one-field unit basis; therefore, they are delayed by one frame from the corresponding video signals through the recording and reproduction. If the dubbing or the like is repeated in this state, this delay difference is increased one by one, causing a serious inconvenience. To prevent this, it is sufficient to provide other separate heads adapted to reproduce only the audio signals in a manner such that it is preceded by over one frame. However, in case of the arrangement as shown in FIG. 2, the number of heads including the rotary heads for erasure and the, like becomes extremely large; therefore, this construction is practically difficult.

DISCLOSURE OF INVENTION

It is an object of the present invention to provide a system with a simple construction in which a high quality video signal and audio signals are obtained with no displacement in their timing and at the same time the post-recording and editing of the audio and/or video signals can be easily performed. This system has a construction such that: two pairs or groups of rotary heads are provided; upon ordinary recording and reproduction, the video signal and audio signals subjected to digital process (PCM) (processed audio signals) are recorded by use of the preceding pair of heads; the processed audio signals are reproduced and reconverted to the original signals by the preceding pair of heads, while the video signal is reproduced by the pair of heads delayed from the preceding heads; and thereby deriving the reproduced video signal and audio signals in which the timings are coincident. On one hand, upon post-recording and editing of the video signal or audio signals, the recording and reproduction are sharingly executed by the two pairs of heads and thereby to suitably perform the operation.

BEST MODE FOR CARRYING OUT THE INVENTION

Figure 8:
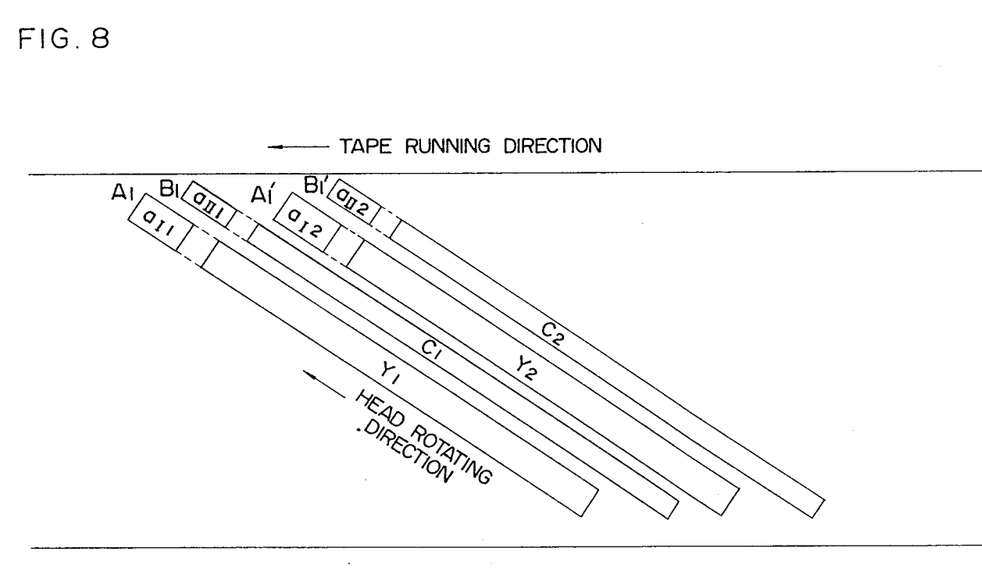
FIG. 8 is a recorded pattern diagram in one embodiment of the present invention.
Figure 9:
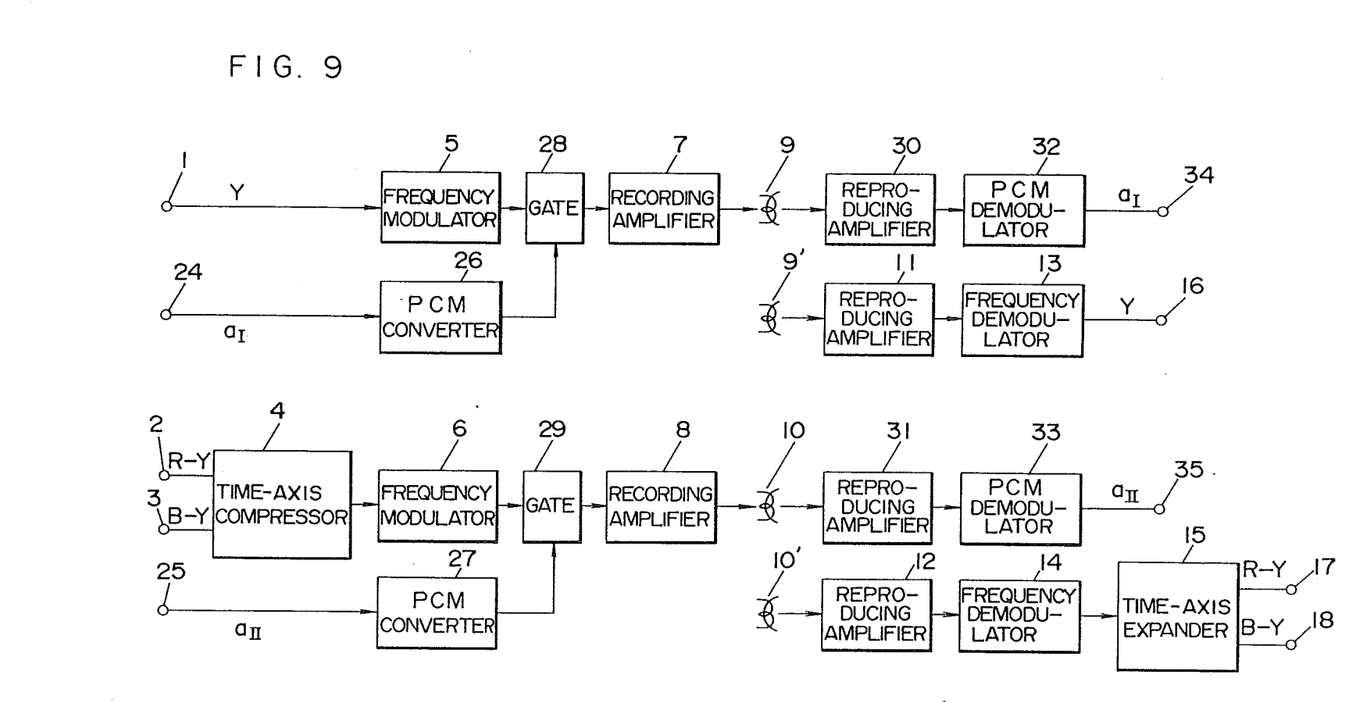
FIG. 9 is a block diagram showing one embodiment of the invention.
Figure 10:
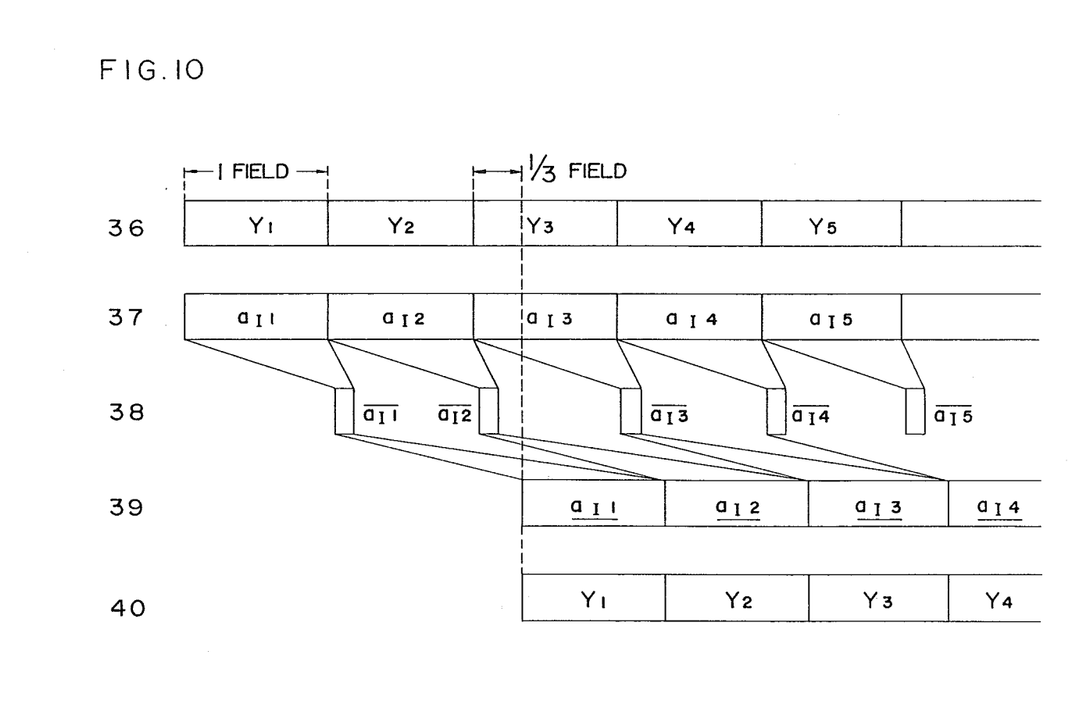
FIG. 10 is a diagram showing the signal timings in FIG. 9.

The present invention will now be described with respect to the case where a tape is wrapped by an angle over 180° around the cylinder having two pairs of rotary heads arranged as shown in FIG. 1 and the time-axis compressed audio PCM signals are recorded into the overlap portion. FIGS. 8 to 10 are recorded pattern diagram, block diagram and signal timing chart of one embodiment of the present invention, respectively. In this embodiment, there will be explained an example in which the audio signals of two channels are recorded and one of the audio signals $a_I$ is recorded by the head by which the Y signal is recorded and the other audio signal $a_{II}$ is recorded by the head by which the C signals are recorded.

In FIG. 9, the same parts and components as those shown in FIG. 4 are designated by the same reference numerals and operate in the same manner. Reference numerals 24 and 25 denote input terminals of the audio signals $a_I$ and $a_{II}$; 26 and 27 PCM converters of the audio signals $a_I$ and $a_{II}$; 28 and 29 gate circuits; 30 and 31 reproducing amplifiers of the PCM audio signals; 32 and 33 demodulators to return the PCM signals to the original states; and 34 and 35 output terminals of the audio signals $a_I$ and $a_{II}$. The Y signal (36 in FIG. 10) inputted to the terminal 1 is modulated by the frequency modulator 5 and is led to the gate 28. On the other hand, the $a_I$ signal (37 in FIG. 10) inputted to the terminal 24 is pulse-code modulated by the PCM converter 26 and is further time-axis compressed as indicated at 38 in FIG. 10 and is led to the gate 28. Reference characters $Y_1, Y_2, \ldots$ denote sequencie of a field unit of the Y signal; $a_{I1}, a_{I2}, \ldots$ indicate sequencie of the $a_I$ signal, in correspondence to the sequencie $Y_1, Y_2, \ldots$; and $\bar{a}_{I1}, \bar{a}_{I2}, \ldots$ represent compressed PCM signals of $a_{I1}, a_{I2}, \ldots$. The Y and $a_I$ signals processed in this way are switched by the gate 28 and amplified by the recording amplifier 7 and recorded on the tape by the head 9 (alternately by $A_1$ and $A_1'$) The C (R-Y, B-Y) and $a_{II}$ signals are also similarly recorded on the tape by the head 10 (alternately by $B_1$ and $B_1'$) (in which, the R-Y and B-Y signals are compressed to produce one signal), so that the pattern shown in FIG. 8 is formed. In FIG. 10, only the Y and $a_I$ signals are shown, but the same shall apply with regard to the C and $a_{II}$ signals as well. When the signals recorded in such a manner are reproduced by the heads 9, 10 or 9', 10', the video signal is reproduced on the basis of the inherent time (although the C signals are delayed by two lines relative to the Y signal due to the compression and expansion, this delay can be easily corrected by way of a delay line or TBC). However, since the audio signals are compressed and recorded on one-field unit basis, they are delayed by 1.5 to 2 fields from the video signal, including the processing time period for expansion and error correction upon reproduction. In the head arrangement of FIG. 1, the $A_1 (A_1')$ and $B_1 (B_1')$ heads are arranged at the positions which are preceding by 60° (⅓ field) from the $A_2 (A_2')$ and $B_2 (B_2')$ heads, however, according to the present invention, the heights of the heads are further adjusted in such a manner that the $A_1 (A_1')$ and $B_1 (B_1')$ heads are precedent by one frame (two fields)+⅓ field from the $A_2 (A_2')$ and $B_2 (B_2')$ heads. For this purpose, the $A_2 (A_2')$ and $B_2 (B_2')$ heads may be attached at the positions which are lower by only two-tracks pitches as compared with the case where they are merely precedent by ⅓ field. With such an arrangement, the PCM audio signals $\bar{a}_I$ and $\bar{a}_{II}$ are reproduced by use of the preceding heads 9 ($A_1, A_1'$) and 10 ($B_1, B_1'$), while the video signals Y and C are reproduced by way of the delayed heads 9' ($A_2, A_2'$) and 10' ($B_2, B_2'$). The processes of the Y and $a_I$ signals will be described hereinbelow with reference to FIGS. 9 and 10. The same shall apply with regard to the C and $a_{II}$ signals as well. The Y and $\bar{a}_{II}$ signals reproduced by the head 9 have the timings as indicated at 36 and 38 in FIG. 10. On the other hand, the head 9' is delayed by one frame +⅓ field, so that the Y signal reproduced by the head 9' has a timing as indicated at 40 in FIG. 10. This reproduced signal is amplified by the reproducing amplifier 11 and is demodulated by the frequency demodulator 13, so that the reproduced Y signal is derived from the output terminal 16. On the other hand, the $\bar{a}_I$ signal reproduced by the head 9 is amplified by the reproducing amplifier 30 and is returned to the original analog audio signal by the PCM demodulator 32 and at the same time it is subjected to error correction and the like and is also delayed until the timing coincides with that of the reproduced Y signal, so that the delayed signal (39 in FIG. 10) is obtained from the output terminal 34. In this manner, the Y signal and the audio signal of channel 1 are obtained at coincident timings at the Y signal output terminal 16 and the $a_I$ signal output terminal 34. In a quite similar manner, the R-Y and B-Y signals and audio signal of channel 2 are derived at coincident timings at the output terminals 17, 18 and 35. In case of processing the video signal by the TBC, the audio signals may be delayed in correspondence thereto.

In addition, as a method whereby the PCM audio signals are reproduced by the preceding heads and the video signal is reproduced by the delayed heads, it is also possible to adopt a method whereby: the heads $A_2 (A_2')$ and $B_2 (B_2')$ are mounted on movable elements such as piezo-electric elements or the like; upon recording, the heads $A_1 (A_1')$ and $B_1 (B_1')$ are arranged at the positions preceding from the heads $A_2 (A_2')$ and $B_2 (B_2')$ and thereby to perform the simultaneous reproduction as explained above; while upon reproduction, the heads $A_2 (A_2')$ and $B_2 (B_2')$ are contrarily moved so as to be precedent and the PCM audio signals are reproduced by these preceding heads and the video signal is reproduced by the heads $A_1 (A_1')$ and $B_1 (B_1')$.

As described above, according to the present invention, the video signal and the PCM recorded and reproduced audio signals in which the timings are coincident can be obtained without providing the preceding heads for audio signals.

As for the recording system of chrominance signals, as mentioned above, in addition to the system whereby the R-Y and B-Y signals are time-axis compressed and frequency-modulated and then recorded, it is also possible to adopt any other systems, such as a system whereby the R-Y signal (or I signal) and B-Y signal (or Q signal) are respectively frequency-modulated and frequency-multiplexed and then recorded. On one hand, in the foregoing embodiment, there has been adopted the method whereby two-channel audio signals are respectively recorded and reproduced by the heads for Y signal and by the heads for C signals. However, it is also possible to properly process the audio signals of a plurality of channels and distribute to the heads for Y and C signals and thereby to record those audio signals.

On the other hand, the recorded pattern is not limited to FIG. 8 but it is possible to adopt a pattern in which the spaces are eliminated by arranging the heads for Y and C signals with azimuth angles, or a pattern in which the track widths for Y and C signals are made equal.

Although the present invention has been described in the above with respect to the case where the PCM audio signals are recorded in the overlap portion, the invention is not limited to this. The invention is also useful in the case where the audio signals subjected to the processes such as PCM are frequency-multiplexed to the video signal and are recorded, where the audio signals are multiplexed in the blanking period of the video signal and are recorded, or the like. Even in those cases, the processed audio signals cause the similar delay as described above since they are processed on a field unit basis for error correction and elimination of head switching noise; therefore, the timings can be made coincident by the present invention.

In addition, although the case where the video signal is recorded in separate tracks for Y and C signals has been described above, the invention is also useful for a system whereby the composite video signal is directly frequency-modulated and recorded, or a system whereby the luminance signal and the chrominance signal are separated and the chrominance signal is converted to the low frequency band of the frequency-modulated luminance signal and recorded. In this case, the audio signals may be recorded by use of the same head by processing a plurality of channels.

Further, according to the present invention, the video signal and the processed audio signals are recorded by a pair of preceding heads, while these signals can be simultaneously reproduced by the pair of delayed heads. At this time, the reproduced audio signals are delayed from the video signal, but no problem will be caused with respect to the viewpoint of the monitor to check the recording state. In addition, in the case where after the video signal was recorded, the processed audio signals are recorded on the tape on which at least the video signal has been recorded, or where only the audio signals are exchanged or edited and newly connected, if the processed audio signals are recorded by the pair of preceding heads while reproducing the video signal by the pair of delayed heads or a switching from the reproduction to the recording is performed, the reproduction of the video signal and the recording of the audio signals can be performed by the separate pairs of heads. Consequently, the reproduced video signal is not disturbed during recording of the audio signals and the reproduced image of a good quality can be derived. If the signal transmitted through the whole processing system is monitored as the recorded audio signal, its timing is made coincident with that of the image. In this case, the processed audio signals may be overlappingly recorded in the portion where the video signal has already been recorded. If the audio signals are erased by the rotary erasing heads (which can be also used for erasure upon editing of the video signal) which are further precedent from the preceding heads, it is possible to perform the rewriting with a further better quality.

As shown in the pattern of FIG. 8, if the audio signals of separate channels are recorded by the heads for Y signal and the heads for C signals, respectively, the rewriting and editing can be easily carried out independently in each channel. In this case, by recording the signal of one channel by the preceding heads and reproducing the signal of the other channel by the delayed heads (or, vice versa), it is possible to prevent disturbance of the recorded audio signals to the reproduced audio signals.

It is also possible to reproduce the processed audio signals by the preceding heads and record a part of these signals and new audio signals by the delayed heads and thereby to exchange a part of the audio signals or replace the video signal by the delayed heads while making the timings coincide with that of the reproduced audio signals.

To edit the video signal or edit the video signal and audio signals, they are reproduced by the preceding heads, and from the timing point of editing the signals to be exchanged are erased by rotary erasing heads which are further precedent from the preceding heads, and the video signal (and the processed audio signals) is recorded by the preceding heads, thereby making it possible to edit a continuous video signal.

INDUSTRIAL APPLICABILITY

According to the present invention, it is possible to obtain the reproduced video signal of a high quality and the reproduced audio signal of a high quality due to the digital recording by use of a small-sized system. The timings of the reproduced video signal and of the audio signals can be made coincident without providing the preceding heads for audio signals. In addition, by recording the audio signals in separate channels by the heads for Y signal and the heads for C signals, the audio signal of only a desired channel can be replaced by a simple constitution. Further, by proper use of the two pairs of heads for the recording and reproduction of the video and audio signals, the reproduced signals without disturbance can be derived upon post-recording, the timings of the video signal and of the audio signals can be made coincident, and continuous editing can be performed.

We claim:

1. A rotary head magnetic recording and reproducing system comprising:
   means for supplying at least one audio signal and a video signal to be recorded;
   two groups of rotary transducer heads, on a rotary cylinder, one group of said rotary heads preceding another group of rotary heads in a rotary direction of said heads during each of recording and reproducing modes, said two groups of rotary heads being arranged to record and reproduce a predetermined unit of a video signal, and an audio signal corresponding to said unit of video signal on a magnetic tape in record tracks which are slanted with respect to a longitudinal direction of said magnetic tape, each record track having respective portions for recording and reproducing video and audio signals; and
   means for causing said rotary heads to record said supplied audio and video signals and to reproduce recorded audio and video signals, such that: (a) supplied video and audio signals are recorded by a preceding group of rotary heads, and, at the same time, recorded video and audio signals are reproduced by a subsequent lagging group of rotary heads during a recorded mode; (b) recorded audio signals are reproduced by a preceding group of rotary heads during a reproduction mode; and (c) a recorded video signal is reproduced during said reproduction mode by a group of rotary heads which lag behind the reproduction mode preceding group of rotary heads, with means for time adjusting the audio signals reproduced by the preceding group of rotary heads with respect to the video signal reproduced by the lagging group of heads.

2. A rotary head magnetic recording and reproducing system comprising:
   means for supplying at least one audio signal and a video signal to be recorded;
   two groups of rotary transducer heads, each group comprising at least two pairs of transducer heads, mounted such that each head of a pair of heads is diametrically opposite to one another on a rotary cylinder, one group of said rotary heads preceding another group of rotary heads in a rotary direction of said heads during each of recording and reproducing modes, said two groups of rotary heads being arranged to record and reproduce a predetermined unit of a video signal, and an audio signal corresponding to said unit of video signal on a magnetic tape in record tracks which are slanted with respect to a longitudinal direction of said magnetic tape, each record track having respective portions for recording and reproducing video and audio signals; and
   means for causing said rotary heads to record said supplied audio and video signals and to reproduce recorded audio and video signals, such that: (a) supplied video and audio signals are recorded by a preceding group of rotary heads during a recording mode; (b) recorded audio signals are reproduced by a preceding pair of rotary heads during a reproduction mode; and, (c) a recorded video signal is reproduced during said reproduction mode by a group of rotary heads which lag behind the reproduction mode preceding pair of rotary heads.

3. A system according to claim 2, further comprising means for causing, during the recording mode, said preceding group of rotary heads to record the video signal and, at the same time, causing said lagging group of rotary heads to reproduce a recorded video signal and at least one recorded audio signal.

4. A system according to claim 2, wherein each group comprises one pair of transducer heads adapted to record and reproduce one of three components of the supplied video signal and the audio signal of at least one or more channels and the other pair of transducer heads adapted to record and reproduce the other two components of the video signal and audio signals of the remaining channels.

5. A system according to claim 2 wherein said at least one audio signal is a digitally processed audio signal.

6. A rotary head magnetic recording and reproducing system comprising:
   means for supplying at least one audio signal and a video signal to be recorded;
   two groups of rotary transducer heads, each group comprising at least two pairs of transducer heads, mounted such that each head of a pair of heads is diametrically opposite to one another on a rotary cylinder, one group of said rotary heads preceding another group of rotary heads in a rotary direction of said heads during each of recording and reproducing modes, said two groups of rotary heads being arranged to record and reproduce a predetermined unit of a video signal, and an audio signal corresponding to said unit of video signal on a magnetic tape in record tracks which are slanted with respect to a longitudinal direction of said magnetic tape, each record track having respective portions for recording and reproducing video and audio signals;
   rotary erasing heads arranged to precede said two groups of rotary heads in the rotating direction of said rotary heads; and
   means for causing said rotary heads to record said supplied audio and video signals and to reproduce recorded audio and video signals, such that: (a) supplied video and audio signals are recorded by a preceding group of rotary heads during a recording mode; (b) recorded audio signals are reproduced by a preceding pair of rotary heads during a reproduction mode; and, (c) a recorded video signal is reproduced during said reproduction mode by a group of rotary heads which lag behind the reproduction mode preceding pair of rotary heads, wherein said each group of rotary heads comprises one pair of transducer heads adapted to record and reproduce one of three components of the supplied video signal and the audio signals of at least one or more channels and another pair of transducer heads adapted to record and reproduce the other two components of the video signal and audio signals of the remaining channels.

7. A rotary head magnetic recording and reproducing system comprising:
   means for supplying audio signals of a plurality of channels and a video signal to be recorded;
   two groups of rotary transducer heads with each group comprising at least two pairs of transducer heads, each head of a pair being mounted diametrically opposite to another head of the pair on a rotary cylinder, one group of said rotary heads preceding another group of rotary heads in a rotary direction of said heads during each of recording and reproducing modes, said two groups of rotary heads being arranged to record and reproduce a predetermined unit of a video signal, and an audio signal corresponding to said unit of video signal on a magnetic tape in record tracks which are slanted with respect to a longitudinal direction of said magnetic tape, each record track having respective portions for recording and reproducing video and audio signals; and
   means for causing said rotary heads to record said supplied audio and video signals, such that:
   (a) in a recording mode a supplied video signal is recorded by the preceding group of rotary heads, a supplied audio signal of at least one channel is recorded by one of said two groups of rotary heads, while the audio signal of another channel in reproduced by the other of said two groups of rotary heads; and
   (b) in a reproduction mode, recorded audio signals are reproduced by a preceding pair of rotary heads and a recorded video signal is reproduced by a group of rotary heads lagging behind said preceding pair of rotary heads.

* * * * *